E. A. SPERRY.
NAVIGATIONAL APPARATUS.
APPLICATION FILED NOV. 13, 1914.

1,360,694.

Patented Nov. 30, 1920.
5 SHEETS—SHEET 1.

WITNESSES:
August F. Schraegle
Fred C. Narveren

INVENTOR.
ELMER A. SPERRY
BY Herbert H. Thompson,
ATTORNEY.

E. A. SPERRY.
NAVIGATIONAL APPARATUS.
APPLICATION FILED NOV. 13, 1914.

1,360,694.

Patented Nov. 30, 1920.
5 SHEETS—SHEET 2.

WITNESSES:
August F. Schaegle
Fred C. Narveren

INVENTOR.
ELMER A. SPERRY
BY Herbert H. Thompson,
ATTORNEY.

E. A. SPERRY.
NAVIGATIONAL APPARATUS.
APPLICATION FILED NOV. 13, 1914.
1,360,694.
Patented Nov. 30, 1920.
5 SHEETS—SHEET 3.
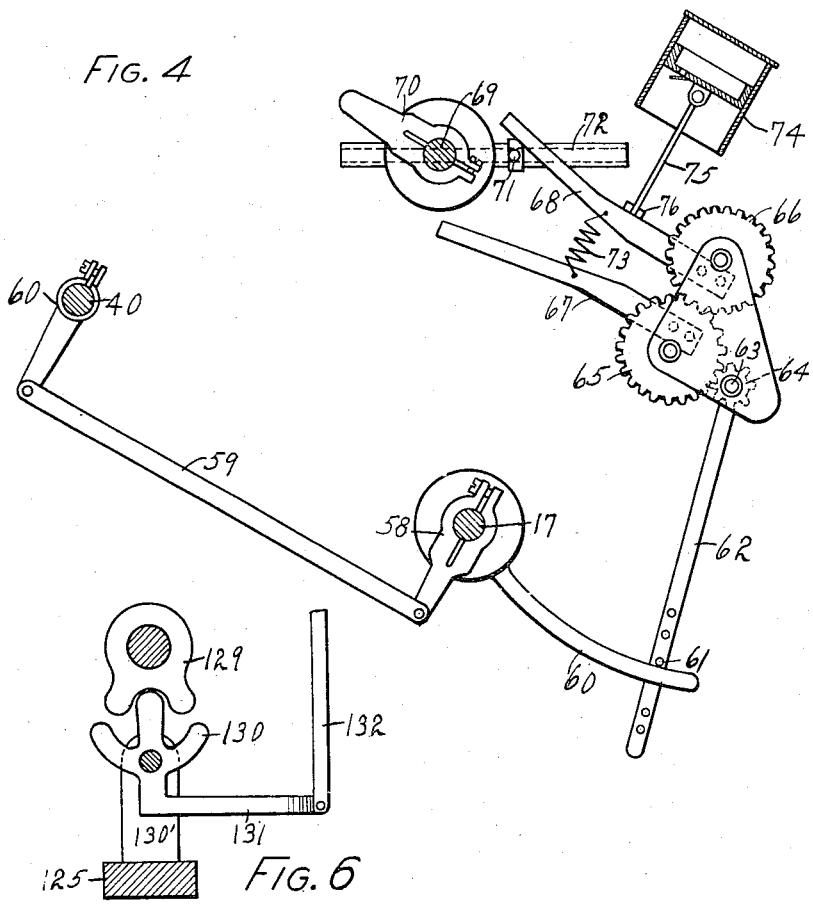
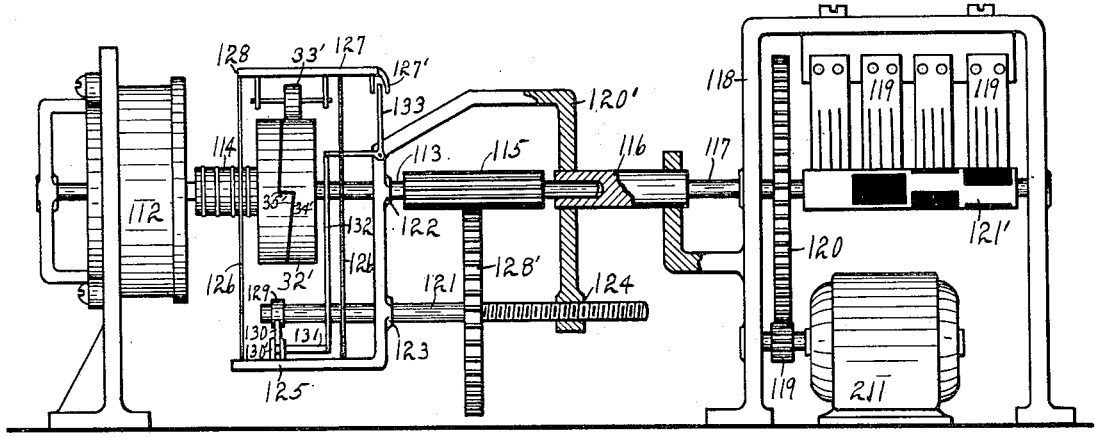
WITNESSES:
August F. Schraegle
Fred C. Narveson.
INVENTOR.
ELMER A. SPERRY
BY Herbert H. Thompson
ATTORNEY.

E. A. SPERRY.
NAVIGATIONAL APPARATUS.
APPLICATION FILED NOV. 13, 1914.
1,360,694.
Patented Nov. 30, 1920.
5 SHEETS—SHEET 4.
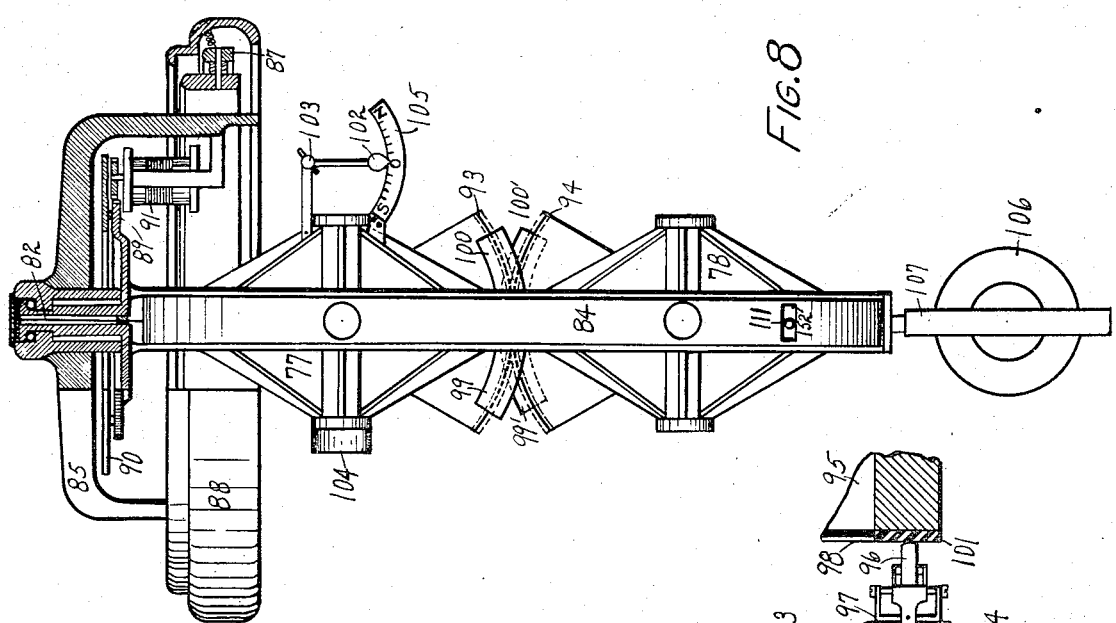
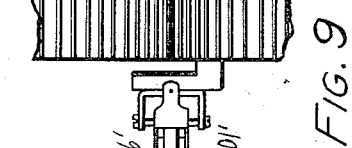
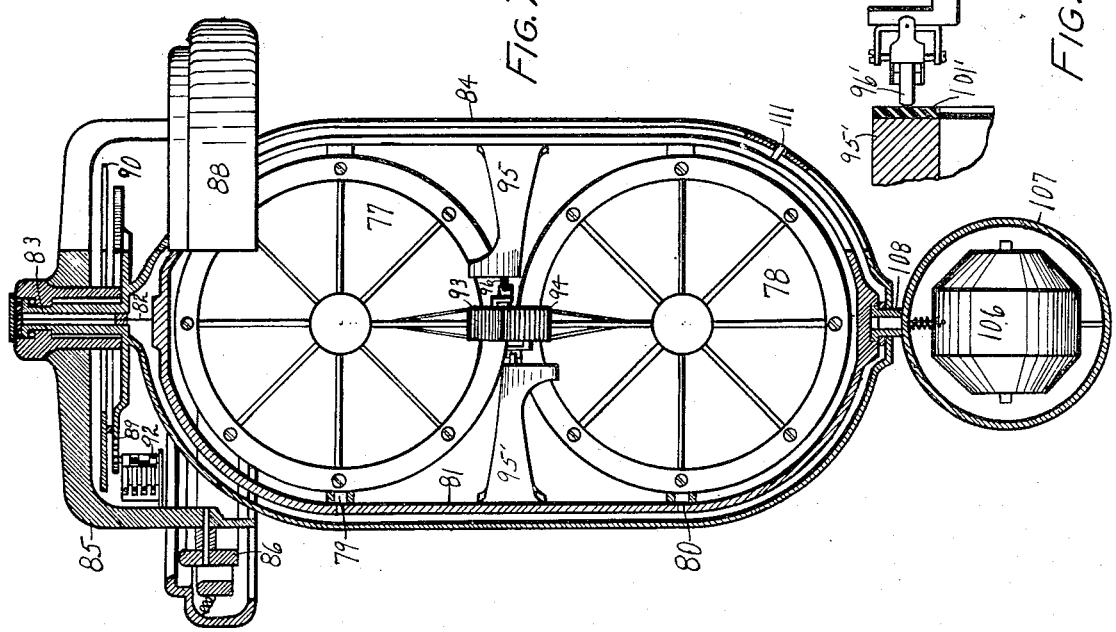
WITNESSES:
August F. Schraegle
Fred C. Naweren
INVENTOR.
ELMER A. SPERRY
BY Herbert H. Thompson,
ATTORNEY.

UNITED STATES PATENT OFFICE.

ELMER A. SPERRY, OF BROOKLYN, NEW YORK, ASSIGNOR TO THE SPERRY GYROSCOPE COMPANY, OF BROOKLYN, NEW YORK, A CORPORATION OF NEW YORK.

NAVIGATIONAL APPARATUS.

1,360,694.   Specification of Letters Patent.   Patented Nov. 30, 1920.

Application filed November 13, 1914. Serial No. 871,885.

*To all whom it may concern:*

Be it known that I, ELMER A. SPERRY, a citizen of the United States of America, residing at 100 Marlborough road, Brooklyn, New York, have invented certain new and useful Improvements in Navigational Apparatus, of which the following is a specification.

This invention relates to the navigation of all kinds of craft, more especially to the steering of craft which are guided by means of a rudder, such as vessels, torpedoes, aeroplanes and dirigible airships. The proper steering of such craft presents several peculiar difficulties. The first is to provide an unfailing indication of the ship's course, the second is to keep the ship on its course. This problem is complicated by the somewhat peculiar conditions which are found in steering craft guided by a rudder at the stern. The condition thus presented may be said to be one of unstable equilibrium, as is evidenced by the constant yawing of a ship.

The main object of this invention is to overcome both of these difficulties and to devise an apparatus which will automatically keep a ship on its course, so that the pilot may be relieved of at least the greater part of the manual work of steering. In working out this invention, I have also made several improvements which are of great individual importance, as will be evidenced as the description proceeds.

Referring to the drawings in which one embodiment of my invention is shown for purposes of illustration, Figure 1, is an elevation of that portion of the steering apparatus which is adapted to be placed in the pilot house, showing how it may be connected up with the present form of steering gear.

Fig. 4, is a detail thereof.

Fig. 5, is an elevation, partly in section, of the relay which is adapted to be used between the master course indicator and the automatic steering gear.

Fig. 6, is a detail thereof.

Figs. 7 and 8, are a front and side elevation respectively of the master course indicator, which is of the gyroscopic type.

Fig. 9, is a detail thereof.

Figure 2:
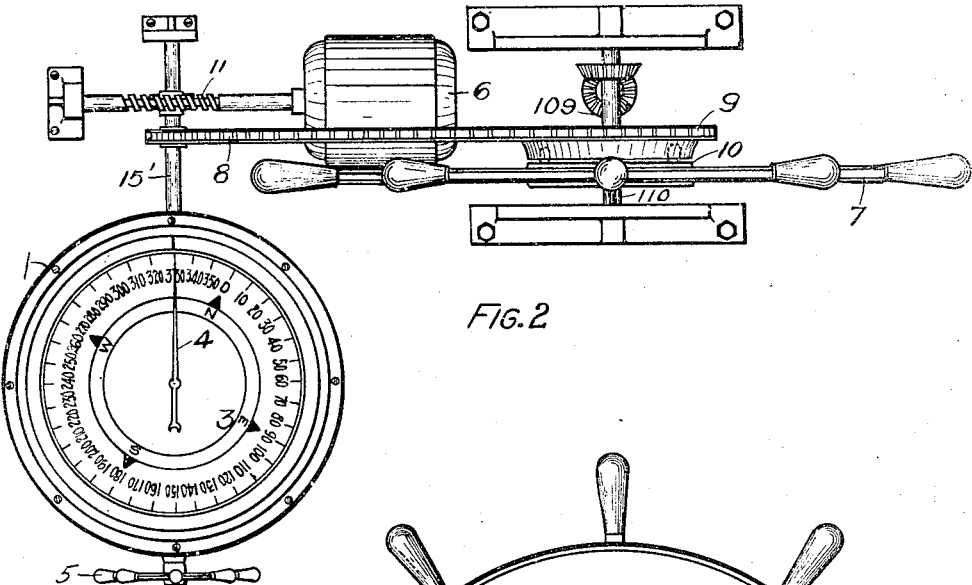
Fig. 2, is a plan view thereof.
Figure 1:
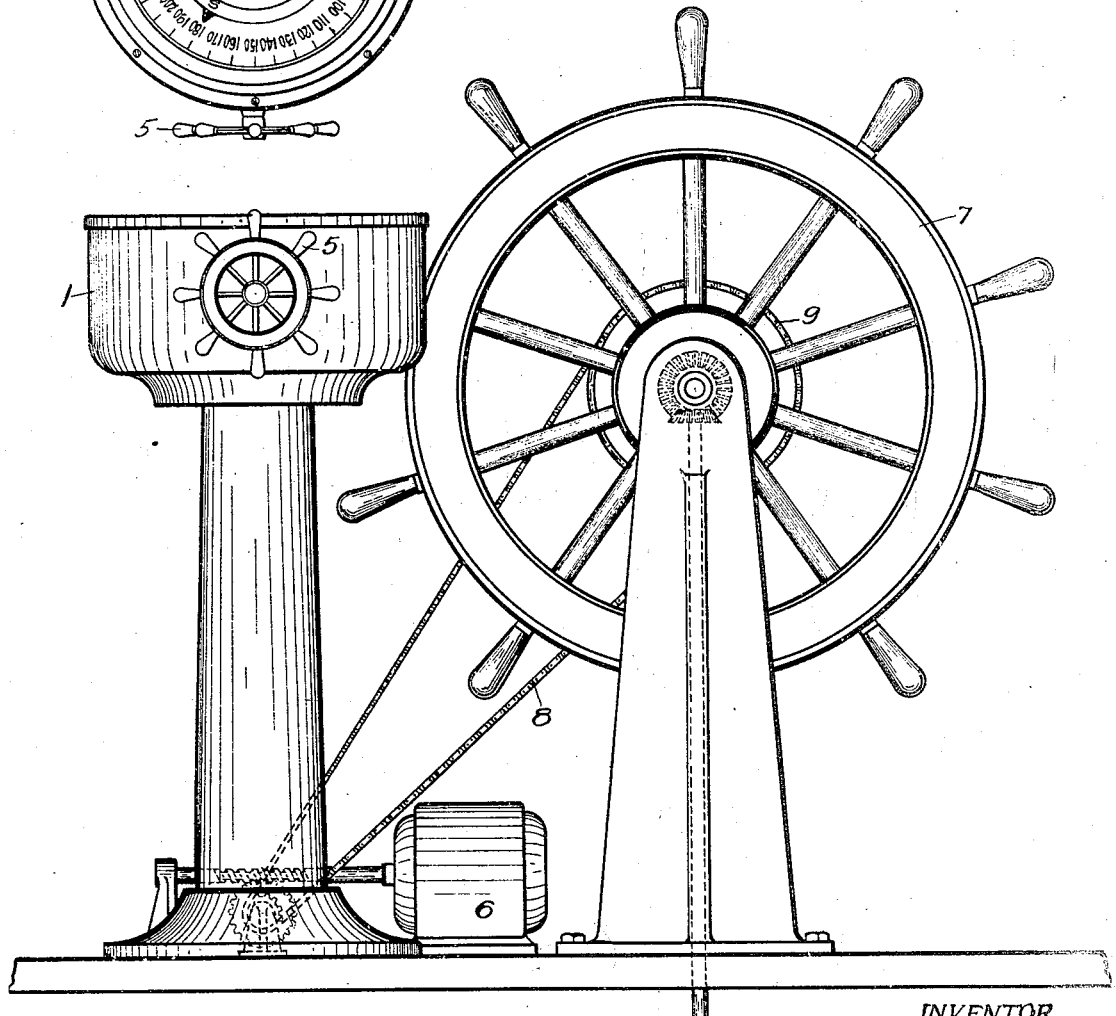
Figure 3:
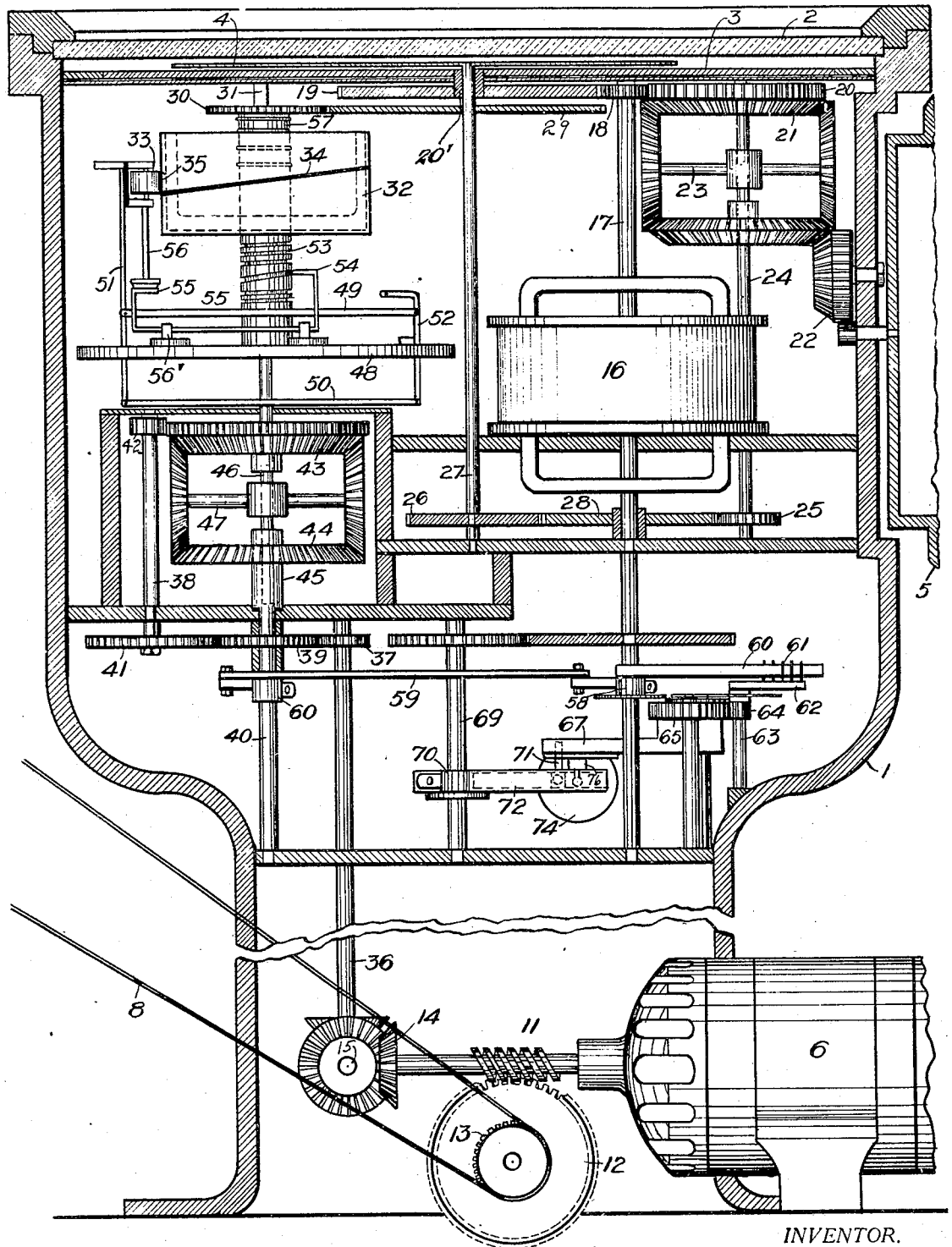
Fig. 3, is an enlarged section of the automatic steering gear, being in part diagrammatic in order to show all of the details in one view.

As before indicated, the apparatus I now employ to carry out my invention comprises several different instruments, all coöperating however to produce the desired result. It is obvious, however, that all may be combined in one instrument, if desired. The instrument shown in Figs. 1, 2 and 3 may be termed the master controller. It comprises a casing 1 containing the delicate portions of the mechanism, and provided with a transparent cover 2, through which a card 3 fixed in azimuth, and course indicating dial 4 are visible. Said dial is set by a hand wheel 5. Automatic connections, hereinafter described, are provided between the course indicator and an electric motor 6 which controls, either directly or indirectly, the helm. I prefer to locate the master controller in the pilot house and to connect motor 6 with the pilot wheel 7 by means of a chain 8, passing over a sprocket gear 9 located adjacent said wheel. A clutch 10 is provided between said wheel and gear so that the pilot wheel may be operated by hand or by the master controller at will, said wheel being slidably but non-rotatably mounted on its shaft 109 by spline 110. Motor 6 is set outside of casing 1 and carries on its shaft a worm 11, driving worm wheel 12, which carries the sprocket wheel 13 for chain 8. In Fig. 3 the motor shaft is also provided with a bevel gear 14, driving a cross shaft 15 entering the base of case 1 by means of which a follow up connection from the steering gear is introduced. In Figs. 1 and 2 this construction is simplified by omitting the bevel gears and mounting the worm wheel directly on cross shaft $15^1$.

The card 3 may be maintained fixed in azimuth in any approved manner, preferably by means of a repeater motor 16 actuated from some type of gyroscopic compass. The shaft 17 of said motor is provided with a pinion 18, which drives a gear 19 secured to a sleeve 20', which carries adjacent its top the card 3. Means are also provided to hold the course indicator 4 fixed in azimuth except when adjusted by the hand wheel 5. Gear 18 also meshes with a gear 20 which serves to drive one arm 21 of a bevel gear, epicyclic train 21. The opposite arm is driven from hand wheel 5 through gears 22, with the result that the planetary member 23 transmits to the shaft 24 on which it is pinned a motion which is the resultant of the other two. A pinion 25 on shaft 24 drives a gear 26 fixed on shaft 27 through an idler 28 loosely mounted on shaft 17. Adjacent the top of shaft 27 is carried the course indicating dial 4. The control of motor 6 from said dial is effected through a follow up contact system. A gear 29 is secured to shaft 27 and meshes with a second gear 30 fixed to a shaft 31 carrying the controller drum or controller 32. It will readily be seen that when the ship turns or when the course indicator is changed the drum will be rotated one way or the other. A trolley 33 rests on the drum. The conducting surface of the drum is divided into two parts by an insulating strip 34, one side being positive and the other negative. The shape of the contacts can be seen better in Fig. 5, in which a similar form of drum $32^1$ is shown. The insulating strip is Z shaped and at its crossed portion 35 is but slightly longer than the trolley 33 or $33^1$ is wide. It is on this portion that the trolley normally rests, as shown in Fig. 3. Now, if the drum be rotated the trolley will immediately contact with one of the contact strips causing the motor 6 to shift the helm.

The follow up connection from the steering gear is introduced as previously noted from motor 6 through shaft 15 with its bevel gears and vertical shaft 36 extending up through the casing 1, and carrying at its upper end a pinion 37. Said pinion drives a shaft 38 through idler 39 loosely mounted on shaft 40 and gear 41 fixed on shaft 38. A pinion 42, secured adjacent the other end of said shaft serves to drive double faced gear 43, which forms one arm of another epicyclic train of gearing. The opposite arm 44 comprises a bevel gear with an elongated hub 45, which is secured at one end to shaft 40, the hub portion forming a bearing for the shaft 46 to which the planetary arm 47 is secured. Said arm 47 receives its main motion from gear 43, as the motion of gear 44 is merely oscillatory as will be explained hereinafter. Secured to shaft 46 is a platform 48, which supports the trolley through a system of parallel links 49, 50, 51, of which 49 and 50 are pivoted to the fixed upright 52, while 51 supports and guides the trolley 33. Means are thus provided to cause the trolley to follow the rotation of the drum. If, however, the course indicator be suddenly shifted through a large angle, it might happen that the drum advanced a revolution or more ahead of the trolley before the motor 6 had time to bring the trolley around. To meet such a contingency, I have devised several different mechanisms, one of which is shown in Fig. 3, and another in Fig. 5. In Fig. 3, I provide the extending hub of drum 32 with a spiral groove 53 into which fits a finger 54, forming one end of a bent lever 55. Said lever is pivoted on platform 48 by means of ears 56' positioned in front of finger 54, so that an up or down movement of said finger will rock the lever and oscillate the end 55, on which the weight of the trolley 33 and the parallel linkage rests by means of support 56. It will be seen that as soon as the drum starts to rotate faster or slower than the platform 48, carrying finger 54 and trolley 33, the said finger will be advanced or retracted by the groove 53, causing a corresponding movement of trolley 33. The spiral groove is so designed that the trolley is moved beyond the cross portion 35 of the insulation by the time one relative revolution of the parts is reached, thus insuring the trolley remaining on the correct contact section. Beyond one complete turn from the center, the spiral is made of less pitch so that the trolley will not be carried off the drum. The hub of the drum is also equipped with contact rings 57, against which current supply brushes (not shown) are adapted to bear.

I prefer to compound a third motion with the motion of one of the members of the rotary contactor 32, 33. This is accomplished by means of the shaft 40 and the epicyclic train 43, 44, 47 described above. The purpose of this is to prevent the yawing of the ship, and to maintain it exactly on its course. An oscillatory motion is imparted to shaft 40 from a friction block 58 through link 59 and crank 60. Said block 58 is clamped somewhat loosely on any shaft which is rotated through a large angle for a very slight change in the heading of the ship, as compared to the relative angle of rotation of drum 32. It is shown as mounted on the motor shaft 17, and it is provided with an extension 60, operating between adjustable pins or stops 61. Said pins in turn are placed upon a lever 62, pivoted at 63 and provided with a pinion 64. Adjacent said pinion is mounted a pair of intermeshing gears 65 and 66, the former meshing with pinion 64. To the face of each gear is secured one member of a pair of scissors 67, 68. On a shaft 69 geared to and hence of similar characteristics to shaft 17 is mounted another friction block 70, which carries an adjustable pin 71 on an arm 72. The scissors are drawn toward each other by a spring 73, but any sudden closing movement is resisted by the one way dash pot 74, which permits only a slow closing movement, but does not oppose the opening of the scissors. The dash pot is shown as connected to member 68 through a pivoted piston rod 75 and a downward extension 76 on said member. The action of this mechanism is as follows:—As the ship yaws first in one direction and then the other, the shafts 69 and 17 are rotated correspondingly. The pin is rotated thereby so as to strike one of the scissors 67 or 68, which will act as a yieldable stop for the pin, opening until the spring tension and inertia overcome the inertia of the whole friction block 70 and the frictional engagement between said block and the shaft 69. When this occurs the block will be brought to rest, but shaft 69 will continue to rotate until the yaw starts in the other direction, when the pin will start in the opposite direction. As soon as the pin leaves the scissors, they will start to close slowly under the action of spring 73 and dash pot 74, but the pin upon striking the other side, will open them again. It will be readily apparent that the normal position assumed by the scissors and hence the normal position of lever 62 will depend upon the rapidity and velocity of the average yawing occurring at that time since the faster and harder the pin 71 strikes, the greater will be the opening of the scissors. But, as the pin 71 is vibrating between the scissors, arm 60 of block 58 is vibrating between pins 61 on arm 62, and the extent of its oscillation is controlled by the position of arm 62 on its pivot, the nearer that the pins are brought toward shaft 17, the greater the extent of oscillation of arm 60 permitted. In other words I contemplate not only damping the yawing by applying a counteractive movement to the helm upon an incipient change in the ship's heading, but also the provision of an anticipatory device which will sense the amount of yawing that is to occur and will govern the extent of corrective motion given to the helm accordingly. It will be evident that the effect of the yaw preventative device is to displace the relative position of the trolley 33 and the contact drum 32, thereby displacing the point at which the motor 6 reverses. It will also be evident that the yaw preventative device imparts a greater movement to the rudder than is required to bring the vessel back to her course if no yawing tendency were present or than would be imparted by means of the automatic steering unit alone.

The type of azimuth indicator which is preferably employed to operate the master controller is illustrated in a general way in Figs. 7 to 9. This instrument is somewhat different from the usual type of gyro-compass, in that this indicator has no directive force. That is, while the gyro-compass will always point north, my indicator will remain in any position in which it is placed on the earth's surface. Properly speaking, therefore, it can not be termed a compass. It will not, however, stay fixed in space, but will follow the rotation of the earth. While attempts have heretofore been made to employ such gyroscopes for various purposes, such as the steering of torpedoes, the success of such devices has been seriously interfered with by the fact that the rotation of the earth would gradually throw the gyroscope off, the error amounting to as much as a degree every four minutes. My invention aims to overcome these defects.

I make use of two rotors designed to be oppositely rotated at the same speed by polyphase alternating current, similar to the method shown in my Patent 1,186,856, gyroscopic apparatus, June 13, 1916. The rotors are not shown, but are inclosed in close-fitting, air tight frames or casings 77 and 78, which conform in a general way to the shape of the rotor. The rotors are mounted on horizontal axes within the casings. These casings are pivoted on diametrically extending, horizontal pivots 79 and 80, on an element 81, which is suspended by means of a member 82 of more or less flexibility. That is, it may be in the form of a torsion filament or wire designed to transmit a torque from the supporting spindle 83, but to do so gradually and without shock or it may be a slender, but comparatively stiff rod. In the latter alternative, the phantom 84, which carries spindle 83, could be omitted. As shown the spindle 83 is rotatably supported by a spider 85, which in turn is supported by the usual gimbal rings 86 and 87, within main frame 88, the support for which is not shown. Secured to said spindle are the large gear 89 and the phantom 84. Gear 89 supports the compass scale 90, and is designed to be rotated by a motor 91, and to rotate a transmitter 92.

Figure 10:
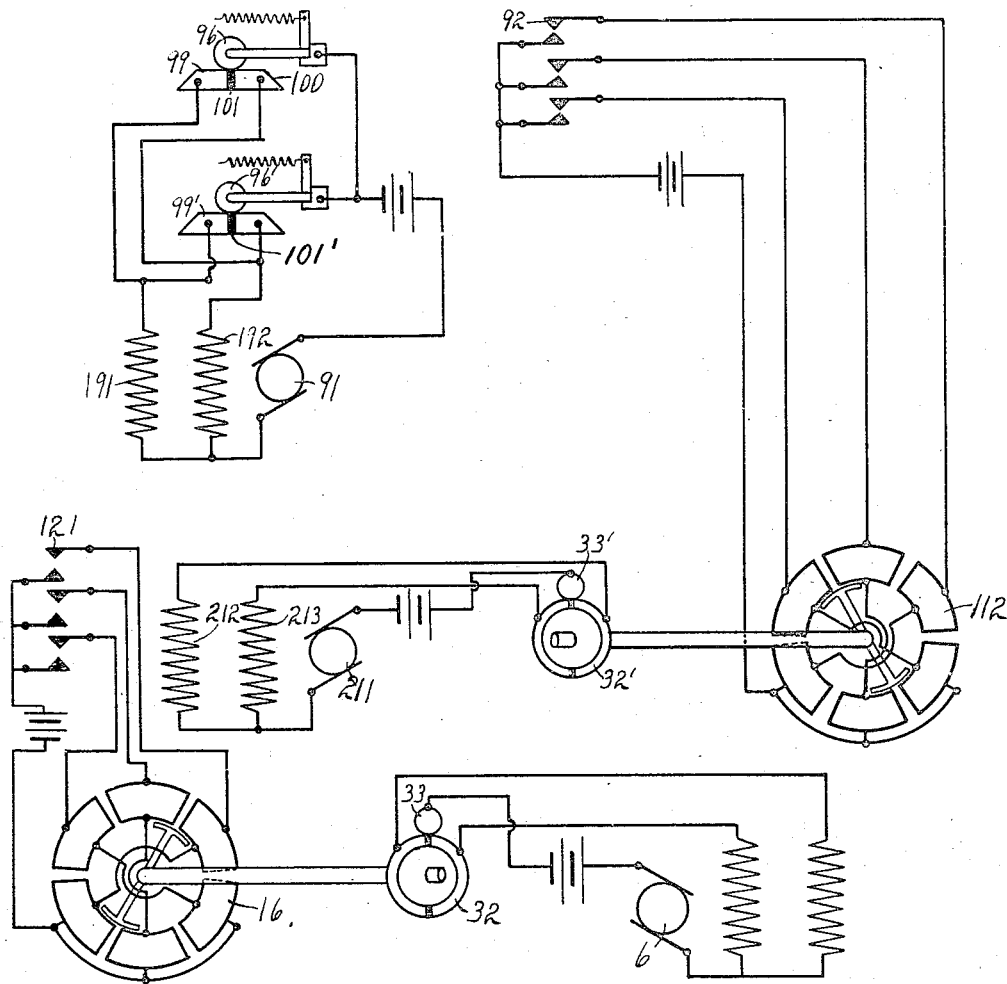
Fig. 10, is a simplified wiring diagram of the entire apparatus.

The two casings are connected so that precession is permitted only in opposite directions, as by means of segmental gears 93 and 94. By this simple construction I am enabled to overcome the chief difficulty connected with this type of gyro-apparatus, namely, the error arising from the earth's rotation, since any tendency for the axis of one gyro to rise is opposed by the equal and opposite tendency of the other gyro. I also employ novel means to overcome the errors due to friction about the vertical axis of the support and due to the force required to drive the transmitter 92, thereby preventing the gyros from wandering. This comprises a contact device which is closed as soon as either gyro precesses beyond a predetermined point, and which operates the motor 91, referred to above. This device may be located upon one of the gears 93 or 94 and upon a bracket 95 fixed to frame 81. It is shown as comprising a trolley 96 pivotally mounted on a base 97 secured to gear 93, and a curved contact strip 98 on bracket 95. Said strip is composed of two conducting sections 99 and 100 separated by a dead section 101. The trolley normally rests on the dead section, but a precession of the gyro in either direction will cause a circuit to be completed through motor 91 as shown in Fig. 10. This will exert a torque about the vertical axis causing the gyro to precess back to its central position. It should be noted that the contact is so located that it is closed only by precession of the gyros and cannot be closed by swinging of the whole frame 81. The contact device is preferably duplicated on the gear 94, as shown, whereby a more perfect balance and greater reliability are secured and the error due to backlash of the gear teeth overcome.

In order to prevent the element 84 from twisting too far away from the frame 81, due to the resiliency of support 82 under the influence of the motor 91, a limit stop may be employed such as pin 111 on one frame working in a slot 152 in the other. The compass card 90, which is mounted on element 84, will thus be kept in the correct position.

By employing this novel device, I avoid the necessity of employing a follow up system and eliminate the effect of friction about the vertical axis, since when the ship turns, practically the entire work necessary to hold the gyros fixed in space and to rotate the transmitter is performed by motor 91.

This motor, however, may be of the same type as the azimuth motor shown in said application. It may be a standard d. c. motor of any type, except that it is provided with two opposed field windings 191 and 192, connected to the contact strips 99, 99', 100 and 100' as shown in Fig. 10 so that the motor is reversed every time the trolleys cross from one contact to the other. The particular type of gyroscopic apparatus above described is not an essential part of this invention but the subject matter thereof is reserved for a divisional application, Serial No. 324,731, filed September 18, 1919, for gyroscopic navigational apparatus.

In all gyroscopic apparatus which is designed to maintain a level on the surface of the earth, it has been found desirable to provide the apparatus with an eccentric weight designed to cause precession about the vertical axis of the instrument at exactly the required rate to keep the instrument in a given position. This rate of precession varies from 360° in 24 hours in a clockwise direction at the north pole through zero at the equator to 360° in 24 hours in a counterclockwise direction, at the south pole. To take care of these varying conditions, I have devised the adjustable weight 102, supported from the clamp-pivot 103, and balanced when in its vertical position by a counter weight 104. Hence this position is the correct one for the equator. In north latitude, the bob 102 is swung out and adjusted so that it points to the corresponding graduation on the circular scale 105, while in south latitude it is swung in. My device possesses the further advantage that the scale need not be graduated with a special scale, but is simply laid out in degrees. This feature is due to the fact that the moment of the weight required is proportional to the cosine of the latitude, while my device secures this result by providing a circular means of adjustment which while it is moved through an equal arc for each degree of change in latitude, the moment applied is proportional to the cosine of the angle it makes with its normal position.

I prefer also to equip this instrument with means to prevent or damp out oscillations in the plane of the frames 81 and 84. For this purpose, I employ a rotor supported in a casing 106, which in turn is pivoted on vertical pivots within a ring 107, the whole being swiveled to the bottom of the frames 84 and 81 at 108. This connection 108 may also serve to connect the two frames 81 and 84.

The transmitter 92 may be used to govern repeater motor 16 directly, but I prefer to interpose a relay of the type shown in Figs. 5 and 6, on account of the fact that a large current must be employed to actuate motor 16, since it is called upon to do considerable work, which would necessitate employing heavy brush pressure on transmitter 92 causing serious trouble, unless a relay were interposed.

Referring now to the relay: 112 represents a small repeater motor actuated from transmitter 92. The shaft 113 of this motor is extended and carries collector rings 114, contact drum 32' forming one part of a two-part commutating device and elongated pinion 115.' The outer end of the shaft is journaled in an enlarged portion 116 of a second shaft 117 journaled in bracket 118. Shaft 117 is rotated by a motor 211, similar to motor 91, through pinion 119 and gear 120, said motor being provided with two opposed field coils 212 and 213 which are excited by different sections of said commutating device. (See Fig. 10). A transmitting commutator 121 of ample size is mounted on said shaft, the motor 211 furnishing sufficient power to turn it under heavy pressure from the brushes 119.

The two transmitters 92 and 121' are shown as being of the same type, the difference being in the size and capacity. Both are provided with four sections, three of which are provided with two diametrically opposite 90° conducting portions, the portions on one section being 30° ahead of those on the adjacent section. All of the sections are electrically connected to the fourth section, as shown. In the wiring diagram in Fig. 10 the transmitters are represented by three contact points which are brought into successive engagement with a common set of contacts. It will be evident that the result attained is the same, which is to excite the three pairs of fields on the repeater motors 16 and 112 in rotation. A follow up device from said motor is used to rotate the trolley 33', which forms a second part of said commutating device. A frame 120' is secured adjacent one end of enlargement 116. Said frame is of irregular shape and is formed with bearings for shafts 113 and 121 at 122 and 123 respectively and also with a threaded bearing 124 for the threaded end of shaft 121. Secured to the outwardly extending foot 125 of the frame is a framework 128 in the form of parallel, flat spring legs 126, carrying at their upper end the trolley 33' by means of a spacing bar 127. It will now be evident that, if the motor 112 turned the drum so that the trolley went to either side of the insulated strip 35', motor 211 would turn the framework 128 so that the trolley again rested on said strip. (See also Fig. 3). It will also be seen that the same problem here presents itself that was found to exist in connection with drum 32 and trolley 33, that is, that there is a danger of the drum getting a complete revolution or more ahead of the trolley. I have shown a different method of overcoming the difficulty in this case from that shown in Fig. 3. The shaft 121, mentioned above, is provided with a gear 128', meshing with pinion 115. Adjacent one end it is also provided with a mutilated pinion 129 which normally engages the middle finger of a three-fingered star wheel 130 pivoted between ears 130' on foot 125. An elbow extension 131 from the star wheel serves to reciprocate the link 132 when the star wheel is rocked on its pivot. A bell crank lever 133, pivoted on frame 120' is linked at one end to link 133, while the other end is restrained between forks 127' on the frame work 128.

The operation of this mechanism is as follows: As long as the two main shafts 113 and 117 rotate at the same speed, the secondary shaft 121 is revolved around shaft 113, but is not rotated on its own axis. As soon, however, as one main shaft falls "out of step" with the other, the secondary shaft is rotated by pinion 115 and gear 128'. This will turn pinion 129, which will rotate the star wheel 130 in one direction or the other, causing the bell crank lever 133 to pull or push the trolley to one side of the center line of the drum. As pinion 129 continues to rotate, it is carried by the longitudinal feeding of the threaded shaft 121 beyond the star wheel before it completes one revolution, so that no matter how many revolutions the drum and trolley fall out of step, the trolley will only be moved a predetermined distance on the first revolution and will remain there until the two factors approach their proper phase relation again, when the pinion 129 will engage one of the outer fingers of star wheel 130 and return it to its normal position. This invention, however, is independent of the specific type of relay used, the claims on the specific relay being incorporated in a divisional application, Serial No. 365,145, filed March 12, 1920, for gyro compass relay transmitter.

Figure 11:
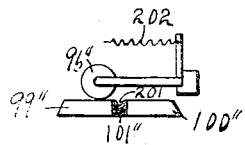
Figs. 11 and 12 are details of modifications of the contactors used on the gyros.

In Fig. 11, a modified form of trolley contact is shown, in which the insulated section 101'' is made with a depressed portion 201 so that when the trolley runs on said section, it will exert a centralizing effect on the gyros, due to the tension of the trolley spring 202.

Figure 12:
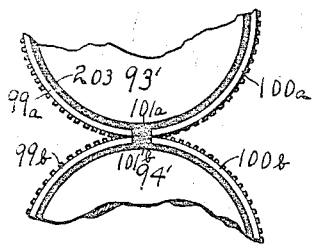

Fig. 12 shows another modified form of contact device for operating the motor 91 on the master indicator. According to this modification, I mount contact strips 99$^a$, 100$^a$, 99$^b$ and 100$^b$ directly on a portion of each rotor casing, preferably on the gear sectors 93' and 94', the strips being separated as before by insulating pieces 101$^a$ and 101$^b$. These strips are placed on the pitch circle of the gear teeth, being arranged to roll upon each other as indicated, and are insulated from the gears by insulation 203. This arrangement does away with the use of any extra parts such as brackets 95 and 95' on the frame 81. It also emphasizes an important advantage of my invention over prior structures, which lies in the fact that the contacts governing motor 91 cannot be closed by any motions of the frame 81, but only precession of the gyros about their pivots 79 and 80.

In accordance with the provisions of the patent statutes, I have herein described the principle of operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

From the foregoing the operation of each of the instruments forming a part of this invention will be readily understood. If the apparatus were installed on an ocean liner, its use would be somewhat as follows: While leaving or entering port, the pilot could use either the customary pilot wheel 7, by disengaging it from clutch 10, or he could use the wheel 5, thus steering with the aid of my master controller 1. The latter would, of course, be preferable, since the yawing would automatically be taken care of by my yawing anticipator and damper. After the ship is on the high sea, the course indicator 4 can be set on the proper course and the ship allowed to take care of itself. My apparatus also finds especial application to war ships, since the accuracy of gun fire is adversely affected by the yawing of the ship, while by means of my invention all yawing is abolished.

Having now described my invention, what I claim and desire to secure by Letters Patent is:

1. In steering apparatus, mechanism controlled by the heading of the ship in azimuth, other mechanism the position of which depends upon the position of the rudder, a two part controller, one of said parts being governed by one of said mechanisms, while the other is governed from the other mechanism, and a steering motor controlled by said controller.

2. In steering apparatus, mechanism controlled by the heading of the ship in azimuth, other mechanism the position of which depends upon the position of the rudder, a contact drum rotated from one of said mechanisms, a brush adapted to be revolved about the same axis as the drum by the other of said mechanisms, and a steering motor controlled from said drum and brush.

3. In steering apparatus, mechanism controlled by the heading of the ship in azimuth, other mechanism the position of which depends upon the position of the rudder, an oscillatory yawing preventive device compounded with one of said mechanisms, a two part governing device, one of said parts being governed as the resultant of one of said mechanisms and the preventive device connected therewith while the other is governed from said other mechanism, and a steering motor controlled by said device.

4. In a steering apparatus, the combination with mechanism for maintaining the ship on its course, of a device for preventing yawing comprising a movable member, means to move said member in a predetermined direction on an incipient change in the heading of the ship, and means operated by the movements of said member for shifting the helm a predetermined amount to correct the yaw.

5. In a steering apparatus, the combination with mechanism for maintaining the ship on its course, of a device for preventing yawing comprising a movable member, means to move said member in a predetermined direction on an incipient change in the heading of the ship, and in the reverse direction on such a change in the opposite direction, and means operated by the movements of said member for shifting the helm a predetermined amount to correct the yaw.

6. In a steering apparatus, the combination with mechanism for maintaining the ship on its course, of a device for preventing yawing comprising an oscillatory member, means to oscillate said member in a predetermined direction on an incipient change in the heading of the ship, and means operated by the movements of said member for shifting the helm a predetermined amount to correct the yaw.

7. In a steering apparatus, the combination with mechanism for maintaining the ship on its course, of a device for preventing yawing comprising an oscillatory member, means to oscillate said member in a predetermined direction on an incipient change in the heading of the ship, and in the reverse direction on such a change in the opposite direction, and means operated by the movement of said member for shifting the helm a predetermined amount to correct the yaw.

8. In a mechanism for preventing yawing the combination with mechanism for maintaining the ship on its course, of a member oscillated by changes in the heading of the ship, and variable means to limit the amplitude of such oscillations including a shiftable stop device, the position of which is governed by the extent of the yawing prevalent at the time, said stop device being arranged to permit a different degree of such oscillations in its various positions.

9. In a mechanism for preventing yawing the combination with a member oscillated by changes in the heading of the ship, of automatic means for varying the extent of such oscillations responsive to the prevalent extent of the yaw.

10. In a mechanism for preventing yawing the combination with a member oscillated by changes in the heading of the ship, of automatic means for varying the extent of such oscillations responsive to the prevalent extent of the yaw, and means operated by the oscillations of said member for shifting the helm an amount proportional to the extent of such oscillations.

11. In a mechanism for preventing yawing the combination with a member oscillated by changes in the heading of the ship, of variable means to limit the amplitude of such oscillations comprising a second member also oscillated by changes in the heading, a yieldable stop against which said second member is adapted to strike, the position of the stop being dependent upon the rapidity of such oscillations.

12. In a steering apparatus for dirigible craft, a course indicator adapted to be set at will, automatic means controlled by said indicator for keeping the craft on its general course and means associated with said aforementioned means for preventing the yawing of the craft.

13. In a mechanism for preventing yawing the combination with a member oscillated by changes in the heading of the ship, of variable means to limit the amplitude of such oscillations comprising a second member also oscillated by changes in the heading, a yieldable stop against which said second member is adapted to strike, the position of the stop being dependent upon the rapidity of such oscillations, said stop controlling by its position the amplitude of the oscillations of said first mentioned member.

14. An automatic steering device for ships or the like including a rotatable controlling element, means for setting the same in any desired direction, and a compass repeating device connected to said element for maintaining its setting in azimuth irrespective of the ship's turning.

15. An automatic steering device for ships or the like including a rotatable controlling element, a differential gear one side of which is connected thereto, a compass repeating device connected to another side of said gear and a settable means connected to the third side.

16. In a steering device, the combination with an azimuth indicator, of a settable course indicator, mechanism actuated by said azimuth indicator when the ship changes its course, a two part controller, one part being actuated by the combined movements of said mechanism and said course indicator, a servo-motor for steering the ship, the other part of said controller being actuated from said motor.

17. In a steering device, the combination with a course indicator, of means for maintaining said indicator fixed in azimuth, means controlled thereby for setting the rudder to correspond thereto, and other means for throwing the rudder farther on slight changes in the heading of the ship.

18. A steering device for ships including an azimuth indicator, a settable course governing device, a steering member, differential means connecting said azimuth indicator and said member to the said device, a steering engine, and automatic means governed by said device for controlling said steering engine.

19. In steering apparatus, an azimuth indicator a settable course governing device including a member having a connection with said indicator, an independently movable member adjacent thereto, a steering engine controlled by the relative movements of said members, and a follow-up connection between said engine and said second member.

20. In combination, a dirigible vessel, a rudder therefor, a manually operable device connected to said rudder for governing the general heading of the vessel, and means responsive to angular movement of the vessel irrespective of its general heading, for displacing the rudder to prevent yawing.

21. The combination of a dirigible craft, a rudder therefor, a manually operable device connected to said rudder, means responsive to an incipient change in the heading of the ship for preventing yawing of the craft, and means controlled by the frequency and extent of yaw for governing said other means.

22. In an automatic steering mechanism, a reversible helm actuator, a two part controller for said actuator, means controlled by the heading of the vessel in azimuth for causing relative displacement between the parts of said controller, and means responsive to the yaw of the vessel for also causing such displacement, whereby the reversing point of said actuator is displaced.

23. In an automatic steering mechanism, a reversible helm actuator, a two part controller for said actuator, means controlled by the heading of the vessel in azimuth for causing relative displacement between the parts of said controller, and means responsive to the direction and amount of yaw for also causing such displacement, whereby the reversing point of said actuator is displaced.

24. In an automatic steering mechanism, a reversible helm actuator, a two part controller for said actuator, means controlled by the heading of the vessel in azimuth for causing relative displacement between the parts of said controller, means responsive to the yaw of the vessel for also causing such displacement, whereby the reversing point of said actuator is displaced, and a follow-up mechanically operated by the actuator for displacing one of the parts of said controllers.

25. In a ship steering device, the combination with a member oscillated by changes in the heading of a ship, the direction and extent of the oscillations being dependent upon the direction and angular velocity of yaw, and means responsive to such oscillations for shifting the helm in accordance with the movement of said member.

26. In an automatic steering device for ships, the combination with the helm, of means responsive to changes in the direction of motion of the ship, means responsive to variations in the angular velocity with which said changes take place, and means for shifting the helm in response to the combined action of said two means.

In testimony whereof, I have signed my name to this specification in the presence of two subscribing witnesses, this 12th day of November, 1914.

ELMER A. SPERRY.

Witnesses:
EARL W. CHAFEE,
F. R. ALLEN.